(12) United States Patent
Weis et al.

(10) Patent No.: US 12,083,835 B2
(45) Date of Patent: Sep. 10, 2024

(54) DAMPENING SYSTEM FOR A TIRE-BEAD LOOSENER

(71) Applicant: Hennessy Industries, Inc., LaVergne, TN (US)

(72) Inventors: Matt Weis, Murfreesboro, TN (US); Andrew Freeman, Hermitage, TN (US)

(73) Assignee: Hennessy Industries, Inc., Lavergne, TN (US)

( * ) Notice: Subject to any disclaimer, the term of this patent is extended or adjusted under 35 U.S.C. 154(b) by 430 days.

(21) Appl. No.: 17/360,867

(22) Filed: Jun. 28, 2021

(65) Prior Publication Data
US 2022/0009297 A1   Jan. 13, 2022

Related U.S. Application Data

(60) Provisional application No. 63/046,650, filed on Jun. 30, 2020.

(51) Int. Cl.
*B60C 25/125* (2006.01)
*B60C 25/01* (2006.01)

(52) U.S. Cl.
CPC .......... *B60C 25/125* (2013.01); *B60C 25/015* (2013.01)

(58) Field of Classification Search
USPC .................................................. 157/1.1–1.24
See application file for complete search history.

(56) References Cited

U.S. PATENT DOCUMENTS

| | | | | |
|---|---|---|---|---|
| 5,657,673 A | * | 8/1997 | Fukamachi | B60C 25/14 157/1.17 |
| 5,992,227 A | * | 11/1999 | Jellison | G01M 17/021 73/146 |
| 9,162,544 B2 | * | 10/2015 | Davis | F16C 11/0695 |

* cited by examiner

*Primary Examiner* — Hadi Shakeri
(74) *Attorney, Agent, or Firm* — Patterson Intellectual Property Law, P.C.; Ryan D. Levy

(57) ABSTRACT

A dampening system for a tire-bead loosener may have a lever in communication with an operation valve, the operation valve configured to channel a supply flow having a supply flow pressure through a first line into a first port of a cylinder and an exhaust flow having an exhaust flow pressure through a second line out of a second port of the cylinder. A pressure line connecting the first line to the second line may include a preset pressure relief valve, a pressure regulator, and a check valve. A bypass flow of the supply flow may move through the pressure line and achieve a damped pressure, thereby channeling through the second line and into the second port of the cylinder. The supply flow pressure in the first port of the cylinder may be cushioned against the exhaust flow pressure and the damped pressure in the second port of the cylinder.

21 Claims, 11 Drawing Sheets

| Original/Current Design Data ||||
| Stage | Raw Time Mark (s) | Converted Time Mark (s) | Distance Traveled (in) | Average Velocity per Section (in/s) |
|---|---|---|---|---|
| Start | 0.00 | 0.000 | 0.0 | 0.00 |
| End of FWD 1 | 1.35 | 0.045 | 12.9 | 286.67 |
| End of RVS 1 | 2.06 | 0.024 | 6.7 | -283.10 |
| Total Settle Time | 6.90 | 0.230 | 8.3 | |

| Damped/Bypassed Design Data - Lowest Pressure Setting (Best Case) ||||
| Stage | Raw Time Mark (s) | Converted Time Mark (s) | Distance Traveled (in) | Average Velocity per Section (in/s) |
|---|---|---|---|---|
| Start | 0.00 | 0.000 | 0.0 | 0.00 |
| End of FWD 1 | 1.49 | 0.050 | 6.7 | 134.90 |
| End of RVS 1 | 2.62 | 0.038 | 3.1 | -82.30 |
| Total Settle Time | 5.70 | 0.190 | 4.5 | |

| Highest Bypass Setting (Worst Case) | Average Velocity (in/s) Original/Current | Average Velocity (in/s) Damped/Bypassed | Percent Reduction Original to Damped |
|---|---|---|---|
| End of FWD 1 | 286.67 | 134.90 | 52.9% |
| End of RVS 1 | -283.10 | -82.30 | 70.9% |

*FIG. 8A*

| Original/Current Design Data | | | | |
|---|---|---|---|---|
| Stage | Raw Time Mark (s) | Converted Time Mark (s) | Distance Traveled (in) | Average Velocity per Section (in/s) |
| Start | 0.00 | 0.000 | 0.0 | 0.00 |
| End of FWD 1 | 1.35 | 0.045 | 12.9 | 286.67 |
| End of RVS 1 | 2.06 | 0.024 | 6.7 | -283.10 |
| Total Settle Time | 6.90 | 0.230 | 8.3 | |

| Damped/Bypassed Design Data - Lowest Pressure Setting (Worst Case) | | | | |
|---|---|---|---|---|
| Stage | Raw Time Mark (s) | Converted Time Mark (s) | Distance Traveled (in) | Average Velocity per Section (in/s) |
| Start | 0.00 | 0.000 | 0.0 | 0.00 |
| End of FWD 1 | 1.40 | 0.047 | 7.2 | 154.29 |
| End of RVS 1 | 2.16 | 0.025 | 4.4 | -173.68 |
| Total Settle Time | 5.23 | 0.174 | 6.2 | |

| Highest Bypass Setting (Worst Case) | Average Velocity (in/s) Original/Current | Average Velocity (in/s) Damped/Bypassed | Percent Reduction Original to Damped |
|---|---|---|---|
| End of FWD 1 | 286.67 | 154.29 | 46.2% |
| End of RVS 1 | -283.10 | -173.68 | 38.6% |

*FIG. 8B*

DAMPENING SYSTEM FOR A TIRE-BEAD LOOSENER

CROSS-REFERENCES TO RELATED APPLICATIONS

This application claims benefit of the following patent application(s) which is/are hereby incorporated by reference: 63/046,650 filed on Jun. 30, 2020

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE DISCLOSURE

The present disclosure relates generally to a tire-bead loosener and more particularly to a dampening system for a tire-bead loosener.

BACKGROUND

In order to change a tire for a vehicle, such as an automobile, light truck, tractor-trailer vehicle, or otherwise, the tire must be loosened, and thereby, removed from a wheel to which the tire is mounted. Together, the tire and the wheel comprise a wheel assembly. To date, manufacturers have proposed and developed tire-bead looseners capable of loosening, and thereby removing, the tire from the wheel to which the tire is mounted. Current models of the tire-bead looseners generally constitute horizontal tire-bead loosening systems or vertical tire-bead loosening systems.

Current models of a tire-bead loosener generally include a pneumatic cylinder, an arm, a handle, and one or more shoes. In order to loosen, and thereby remove, a tire from a wheel, an operator moves the one or more shoes in proximity to, or in contact with, an inner perimeter of the tire. Because the one or more shoes are pivotably connected to the arm, the one or more may be moved in proximity to, or in contact with, the inner perimeter of the tire. The operator proceeds by operating the handle of a lever, whereby the operator may configure the lever into an opened position and a closed position. In the closed position, air is not supplied to a drive side of the pneumatic cylinder. In the open position, however, air is supplied to the drive side of the pneumatic cylinder. Where the valve is configured in the open position, the air is supplied to the drive side of the pneumatic cylinder, and the one or more shoes are in proximity with, or in contact with, the inner perimeter of the tire, pressure is applied against the inner perimeter of the tire by the one or more shoes until the tire is loosened from the rim of the wheel.

In the horizontal tire-bead loosening system, one or more shoes are moved in proximity to, or in contact with, the inner perimeter of the tire. When the valve is configured in the open position and the air is supplied to the drive side of the pneumatic cylinder, the operator rotates the wheel assembly. While the wheel assembly is rotating, pressure is steadily and increasingly applied against the inner perimeter of the tire through the one or more shoes until the tire is loosened from the rim of the wheel. Eventually, where sufficient pressure has been applied rotatably the inner perimeter of the tire, a tire bead of the tire is dislodged or loosened from the rim of the wheel, and the tire can be removed from the rim of the wheel.

In the vertical tire-bead loosening system, the one or more shoes are moved in proximity to, or in contact with, the inner perimeter of the tire. When the valve is configured in the open position and the air is supplied to the drive side of the pneumatic cylinder, the operator identifies a location on the inner perimeter of the tire. Pressure is applied against the location on the inner perimeter of the tire through the one or more shoes until the tire is loosened from the rim of the wheel. Pressure is applied against additional locations on the inner perimeter of the tire by the one or shoes until the rim of the wheel is broken, the tire bead of the tire is dislodged or loosened from the rim of the wheel, and the tire can be removed from the rim of the wheel.

While current models of the tire-bead loosener enable the operator to remove the tire from the wheel, there are a number of drawbacks associated with the current models of the tire-bead loosener, including at least the following limitations specified herein. Current models of the tire-bead loosener require that the tire of the wheel assembly be at least partially deflated (or preferably fully deflated) prior to applying pressure against the inner perimeter of the tire through the one or more shoes. The process of deflating the tire, at least partially (or preferably fully) can be time-consuming, depending upon the availability of tools to deflate the tire.

In addition to drawbacks associated with the time consumption of deflating the tire, at least partially (or preferably fully), current models of the tire-bead loosener require that the tire of the wheel assembly be deflated, at least partially (or preferably fully), in order to avoid causing damage to the wheel assembly or the tire-bead loosener. Where a tire is inflated, at least partially or fully, such as a value of 30 pounds per square inch gauge (psig) to 36 pounds per square inch gauge (psig), an application of pressure against the inner perimeter of an inflated tire through the one or more shoes can cause the one or more shoes to damage the wheel, the tire, a bead of the tire, or any other aspect of the assembly. In addition, the application of pressure against the inner perimeter of the inflated tire through the one or more shoes can cause damage to the tire-tire-bead loosener and/or its constituent parts, such as the one or more shoes, the arm, or the cylinder. Damage to the tire-bead loosener and/or its constituent parts may occur due to a high level of pressure required to loosen the inflated tire from the wheel to which the tire is affixed. Thus, considerable force is required to dislodge the inflated tire from the wheel, and thereby remove the tire from the wheel assembly. The considerable force may cause unwarranted, unwanted, or unpredictable damage to the wheel assembly or the tire-bead loosener and/or its constituent parts.

Furthermore, the application of pressure against the inner perimeter of the inflated tire not only may cause damage to the tire-bead loosener and/or its constituent parts, such as the one or more shoes, the arm, or the cylinder, the application of pressure against the inner perimeter of the inflated tire also may also transfer a recoiling, or shocking, force against the operator of the tire-bead loosener. This may occur where the operator is gripping the handle, moving the one or more shoes in proximity to, or in contact with, the inner perimeter of the tire, and applying pressure against the inner perimeter of the inflated tire. The recoiling, or shocking force, is distributed through the handle and onto a body of the operator, including a hand of the operator. Accordingly, the application of pressure against the inner perimeter of the inflated tire may injure, maim, hurt, or otherwise damage the body of the operator, and in particular, the hand of the of the operator.

Thus, in light of the foregoing disadvantages and drawbacks associated with the current models of the tire-bead loosener, and in particular, the application of pressure against the inner perimeter of the inflated tire, there is a need to provide a tire-bead loosener that overcomes the foregoing limitations.

BRIEF SUMMARY

The present disclosure provides a novel tire-bead loosener. Specifically, the present disclosure provides a novel dampening system for a tire-bead loosener.

In light of the drawbacks of current models of a tire-bead loosener, it would be desirable to provide a tire-bead loosener to overcome the limitations. The present disclosure provides a dampening system for a tire-bead loosener. The dampening system of the present disclosure mitigates, lessens, or otherwise reduces a force from an application of pressure to loosen a tire from a wheel to which the tire is affixed. The dampening system of the present disclosure channels and regulates a supply flow into and an exhaust flow out of a cylinder housing a piston, the piston dividing the cylinder into a first port and a second port. The dampening system of the present disclosure reduces a force from the application of pressure by channeling a bypass flow of the supply flow from the first port and channeling and regulating the bypass flow of the supply into the second port, wherein the second port has the exhaust flow. A pressure of the bypass flow in the second port, coupled with a pressure of the exhaust flow port, opposes, or "cushions against," the supply flow in the first port of the cylinder. The opposition, or "cushioning against," reduces an overall load of force delivered by the one or more shoes onto the tire-bead loosener, against a wheel assembly, and back an operator of the tire-bead loosener. Thus, the dampening system for the tire-bead loosener, as disclosed herein, mitigates against damage inflicted on the tire-bead loosener or the wheel assembly, and prevents or otherwise lessens an injury to the operator of the tire-bead loosener.

In the context of a tire-bead loosener, a dampening system for the tire-bead loosener is provided. The dampening system may include a cylinder, a piston, one or more shoes, an arm, a lever, an operation valve, a preset pressure relief valve, a pressure regulator, and a check valve. The cylinder may house the piston, the piston having a connecting rod. The piston may separate the cylinder into a first port and a second port. The first port may be defined by a side of the cylinder proximate to the connecting rod. The piston of the cylinder may be connected to the arm, and the arm may be pivotably connected to one or more shoe. The arm may be configured to move the one or more shoes in proximity to an inner perimeter of a tire on a wheel. Where the arm is configured to move the one or more shoes in proximity to the inner perimeter of the tire on the wheel, the one or more shoes may be operable to slidably wedge into the inner perimeter of the tire, and the one or more shoes may be configured to loosen the bead of the tire.

An operation valve may be configured to channel a supply flow of a fluid into the cylinder, and the operation valve may be configured to channel an exhaust flow of the fluid out of the cylinder. The supply flow may have a supply flow pressure, and the exhaust flow may have an exhaust flow pressure. A lever may be engaged to the operation valve, and the lever may be operable between a first position and a second position. In the first position, the operation may be configured to channel the supply flow of the fluid through a first line into the first port of the cylinder. The first position may correspond to a retracted position of the piston. In the second position, the operation valve may be configured to channel the supply flow of the fluid through a second line into the second port of the cylinder. The second position may correspond to an extended position of the piston.

A pressure line may connect the first line to the second line. The pressure line may include a preset pressure relief valve, a pressure regulator, and a check valve. The preset pressure relief valve may be in series with the pressure regulator. The preset pressure relief valve and the pressure regulator may be in series with the check valve. The preset pressure relief valve may have a closed pressure relief valve position and an open pressure relief valve position. The open pressure relief valve position may be dependent upon a preset pressure. The open pressure relief valve position may be operable to channel a bypass flow of the supply flow from the first line to the pressure regulator. The pressure regulator may be operable to regulate the bypass flow to a damping pressure. The pressure regulator may be configured to channel the bypass flow at the damping pressure to a check valve. The check valve may be configured to receive the bypass flow at the damping pressure, and the check valve may be further configured to channel the bypass flow at the damping pressure into the second line.

Where the lever is in the second position, the operation valve may channel the supply flow of the fluid through the second line into the second port. The operation valve may channel the exhaust flow of the fluid through the first line out of the first port. The exhaust flow pressure of the first port may approach a value of 0 pounds per square inch (psi). Where the lever is in the first position, the one or more shoes may be in proximity to the inner perimeter of the tire. The operation valve may channel the exhaust flow of the fluid through the second line out of the second portion. The operation valve may channel the supply flow of the fluid through the first line into the first port of the cylinder. The open pressure relief valve position of the preset pressure relief valve may channel the bypass flow of the supply flow from the first line to the pressure regulator. The pressure regulator may regulate the bypass flow of the supply flow to the damping pressure. The pressure regulate may channel the bypass flow at the damping pressure to the check valve. The check valve may receive the bypass flow of the supply flow at the damping pressure, and the check valve may channel the bypass flow at the damping pressure through the second line into eh second port. The damping pressure and exhaust flow pressure of the second port may provide a pressure cushion against the supply flow pressure of the first port, thereby enabling the one or more shoes to slidably wedge into the inner perimeter of the tire and loosen the bead of the tire.

In the context of a tire-bead loosener, a method of dampening the tire-bead loosener is provided. The method may commence with a step of moving one or more shoes of the tire-bead loosener in proximity to an inner perimeter of a tire on a wheel. The tire-bead loosener may include an arm, a piston, a cylinder, a lever, an operation valve, a preset pressure relief valve, a pressure regulator, and a check valve. The arm may be pivotably connected to the one or more shoes, and the arm may be connected to the piston housed within the cylinder. The piston may have a connecting rod, and the piston may separate the cylinder into a first port and a second port. The first port may be defined by a side of the cylinder proximate to the connecting rod. The operation valve may be in communication with the cylinder, and the lever may be engaged to the operation valve.

The method may continue by operating the lever to a first position. In the first position, the operation valve may channel a supply flow of a fluid through a first line into the first port of the cylinder. The supply flow of the fluid may have a supply flow pressure. The operation valve may channel an exhaust flow of the fluid through a second line out of the second port. The exhaust flow of the fluid may have an exhaust flow pressure.

Where the lever is operated in the first position, the method may continue by optionally pressurizing a pressure line. The pressure line may connect the first line to the second line. The pressure line may include the preset pressure relief valve, the pressure regulator, and the check valve. The preset pressure relief valve may be in series with the pressure regulator. The preset pressure relief valve and the pressure regulator may be in series with the check valve.

The method may continue by channeling a bypass flow of the supply flow of the fluid through the first line through an open pressure relief valve position of the preset pressure relief valve. The bypass flow of the supply may be channeled through the first line through the open pressure relief valve position when the supply flow of the fluid achieves a preset pressure. The method may continue by regulating the bypass flow of the supply flow to a damping pressure.

The method may continue by channeling the bypass flow of the supply flow at the damping pressure to the check valve. The check valve may receive the bypass flow of the supply flow at the damping pressure. The method may continue by channeling the bypass flow at the damping pressure out of the check valve and to the second line and into the second port of the cylinder. The method may continue by opposing the damping pressure and the exhaust flow pressure of the second port against the supply flow pressure of the first port.

In one particular and exemplary embodiment, a dampening system for a tire-bead loosener comprises a cylinder, a piston, an arm, one or more shoes, a lever, an operation valve, a preset pressure relief valve, a pressure regulator, and a check valve. The cylinder houses the piston, the piston having a connecting rod. The piston of the cylinder separates the cylinder into a first port and a second port, and the first port is defined by a side of the cylinder proximate to the connecting rod. The piston of the cylinder is connected to the arm, and the arm is pivotably connected to the one or more shoes. The arm is configured to move the one or more shoes in proximity to an inner perimeter of a tire on a wheel. The one or more shoes are operable to slidably wedge into the inner perimeter of the tire, and the one or more shoes are configured to loosen a bead of the tire. The operation valve is configured to channel a supply flow of a fluid into the cylinder, and the operation valve is configured to channel an exhaust flow of the fluid out of the cylinder. The supply flow of the fluid has a supply flow pressure, and the exhaust flow of the fluid has an exhaust flow pressure.

The lever is engaged to the operation valve, and the lever is operable between a first position and a second position. In the first position of the lever, the operation valve is configured to channel the supply flow of the fluid through a first line into the first port of the cylinder. The first position of the lever corresponds to a retracted position of the piston. In the second position of the lever, the operation valve is configured to channel the supply flow of the flow through a second line into the second port of the cylinder. The second position of the lever corresponds to an extended position of the piston.

A pressure line connects the first line to the second line, and the pressure line includes a preset pressure relief valve, a pressure regulator, and a check valve. The preset pressure relief valve is in series with the pressure regulator, and the preset pressure relief valve and the pressure regulator are in series with the check valve. The preset pressure relief valve has a closed pressure relief valve position and an open pressure relief valve position, where the open pressure relief valve position is dependent upon a preset pressure. The open pressure relief valve position is operable to channel a bypass flow of the supply flow from the first line to the pressure regulator. The pressure regulator is operable to regulate the bypass flow to a damping pressure, and the pressure regulator is configured to channel the bypass flow at the damping pressure to the check valve. The check valve is configured to receive the bypass flow at the damping pressure, and the check valve is further configured to channel the bypass flow at the damping pressure into the second line.

Where the lever is in the second position, the operation valve channels the supply flow of the fluid through the second line into the second port, and the operation valve channels the exhaust flow of the fluid through the first line out of the first port. The exhaust flow pressure of the first port approaches a value of 0 pounds per square inch (psi).

Where the lever is in the first position, the one or more shoes is in proximity to the inner perimeter of the tire. The operation valve channels the exhaust flow of the fluid through the second line out of the second port, and the operation valve channels the supply flow of the fluid through the first line into the first port of the cylinder. The open pressure relief valve position of the preset pressure relief valve channels the bypass flow of the supply flow from the first line to the pressure regulator. The pressure regulator regulates the bypass flow to the damping pressure, and the pressure regulator channels the bypass flow at the damping pressure to the check valve. The check valve receives the bypass flow of the supply flow at the damping pressure, and the check valve channels the bypass flow at the damping pressure through the second line into the second port. The damping pressure and exhaust flow pressure of the second port provide a pressure cushion against the supply flow pressure of the first port, such that the one or more shoes slidably wedge into the inner perimeter of the tire and loosen the bead of the tire.

In one aspect according to the above-referenced embodiment, the tire-bead loosener may be a vertical tire-bead loosener.

In another embodiment, the damping pressure may range from about 10 pounds per square inch (psi) to about 50 pounds per square inch (psi).

In another embodiment, the pressure cushion may range from about 55 pounds per square inch (psi) to about 125 pounds per square inch (psi).

In another embodiment, the dampening system may further comprise a handle attached to the lever, and the handle may be configured to operate the lever between the first position and the second position.

In one aspect according to the above-referenced embodiment, the lever may be in the first position, such that the one or more shoes may slidably wedge into the inner perimeter of the tire and loosen the bead of the tire. The handle may have a reduced forward stroke from about 130 inches per second (in/s) to about 155 inches per second (in/s).

In one aspect according to the above-referenced embodiment, the handle may have a reduced reverse stroke from about −80 inches per second (in/s) to about −175 inches per second (in/s).

In another embodiment, the lever may be in the first position, such that the one or more shoes may slidably wedge into the inner perimeter of the tire and loosen the bead of the tire. The handle may have a reduced forward stroke of at least about 20%.

In another embodiment, the lever may be in the first position, such that the one or more shoes may slidably wedge into the inner perimeter of the tire and loosen the bead of the tire. The handle may have a reduced reverse stroke of at least about 20%.

In one particular and exemplary embodiment, a method of dampening a tire-bead loosener commences with a step a) of moving one or more shoes of the tire-bead loosener. The tire-bead loosener includes an arm, the one or more shoes, an arm, a cylinder, a piston, a lever, an operation valve, a preset pressure relief valve, a pressure regulator, and a check valve. The arm is pivotably connected to the one or more shoes, and the arm is connected to the piston housed within the cylinder. The piston has a connecting rod, and the piston separates the cylinder into a first port and a second port. The first port is defined by a side of the cylinder proximate to the connecting rod. The operation valve is in communication with the cylinder, and the lever is engaged to the operation valve. The method continues with a step b) of operating the lever to a first position. In the first position, the operation valve channels a supply flow of a fluid through a first line into the first port of the cylinder, and the operation valve channels an exhaust flow of the fluid through a second line out of the second port. The supply flow of the fluid has a supply flow pressure, and the exhaust flow of the fluid has an exhaust flow pressure.

The method continues with a step c) of optionally pressurizing a pressure line where the lever is operated in the first position. The pressure line connects the first line to the second line. The pressure line includes the preset pressure relief valve, the pressure regulator, and the check valve. The preset pressure relief valve is in series with the pressure regulator, and the preset pressure relief valve and the pressure regulator are in series with the check valve. The method continues with a step d) of channeling a bypass flow of the supply flow of the fluid from the first line through an open pressure relief valve position of the preset pressure relief valve, when the supply flow of the fluid achieves a preset pressure. The method continues with a step e) of regulating the bypass flow to a damping pressure. The method continues with a step f) of channeling the bypass flow at the damping pressure to the check valve, and the check valve receives the bypass flow of the supply flow at the damping pressure. The method continues with a step g) of channeling the bypass flow at the damping pressure to the second line and into the second port of the cylinder. The method continues with a step h) of opposing the damping pressure and the exhaust flow pressure of the second port against the supply flow pressure of the first port.

In one aspect according to the above-referenced embodiment, the step e) of the method may further comprise regulating the bypass flow the damping pressure via the pressure regulator.

In another embodiment, the method may further comprise a step i) of slidably wedging the one or more shoes into the inner perimeter of the tire and loosening a bead of the tire.

In one aspect according to the above-referenced embodiment, the tire-bead loosener may further comprise a handle attached to the lever, and the handle may be configured to operate the lever to the first position.

In one aspect according to the above-referenced embodiment, the method may further comprise a step j) of reducing a forward stroke of the handle from about 130 inches per second (in/s) to about 155 inches per second (in/s) when loosening the bead of the tire.

In one aspect according to the above-referenced embodiment, the step j) of the method may further comprise reducing a reverse stroke of the handle from about −80 inches per second (in/s) to about −175 inches per second (in/s) when loosening the bead of the tire.

In another embodiment, the method may further comprise a step j) of the method of reducing a forward stroke of the handle by at least about 20% when loosening the bead of the tire.

In another embodiment, the method may further comprise a step j) of the method of reducing a reverse stroke of the handle by at least about 20% when loosening the bead of the tire.

In another embodiment, the step b) of the method may further comprise operating the lever to the second position. In the second position, the operation valve may channel the supply flow of the fluid through the second line into the second port, and the operation valve may channel the exhaust flow of the fluid through the first line out of the first port. The exhaust flow pressure of the first port may approach a value of 0 pounds per square inch (psi).

In another embodiment, the tire-bead loosener may be a vertical-bead loosener or a horizontal bead-loosener.

In another embodiment, the damping pressure may range from about 10 pounds per square inch (psi) to about 50 pounds per square inch (psi).

In another embodiment, the step h) of the method yields a pressure cushion between the damping pressure and the exhaust flow pressure of the second port against the supply flow pressure of the first port. The pressure cushion may range from about 55 pounds per square inch (psi) to about 125 pounds per square inch (psi).

Unless otherwise defined, all technical and scientific terms used herein have the same meaning as commonly understood by one of ordinary skill in the art to which this invention belongs. The present invention may be embodied in other specific forms without departing from the spirit or essential attributes thereof, and it is therefore desired that the present embodiment be considered in all aspects as illustrative and not restrictive. Any headings utilized in the description are for convenience only and no legal or limiting effect. Numerous objects, features, and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 8A is a table of data for a forward stroke of a handle on a tire-bead loosener where a tire is at a low pressure when the tire-bead loosener loosens the tire from a wheel assembly and a dampening system is applied to the tire-bead loosener, in accordance with the present disclosure.

FIG. 8B is the table of data for a reverse stroke of the handle on the tire-bead loosener where the tire is at a high pressure when the tire-bead loosener loosens the tire from the wheel assembly and the dampening system is applied to the tire-bead loosener, in accordance with the present disclosure.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like, or any variation thereof, should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
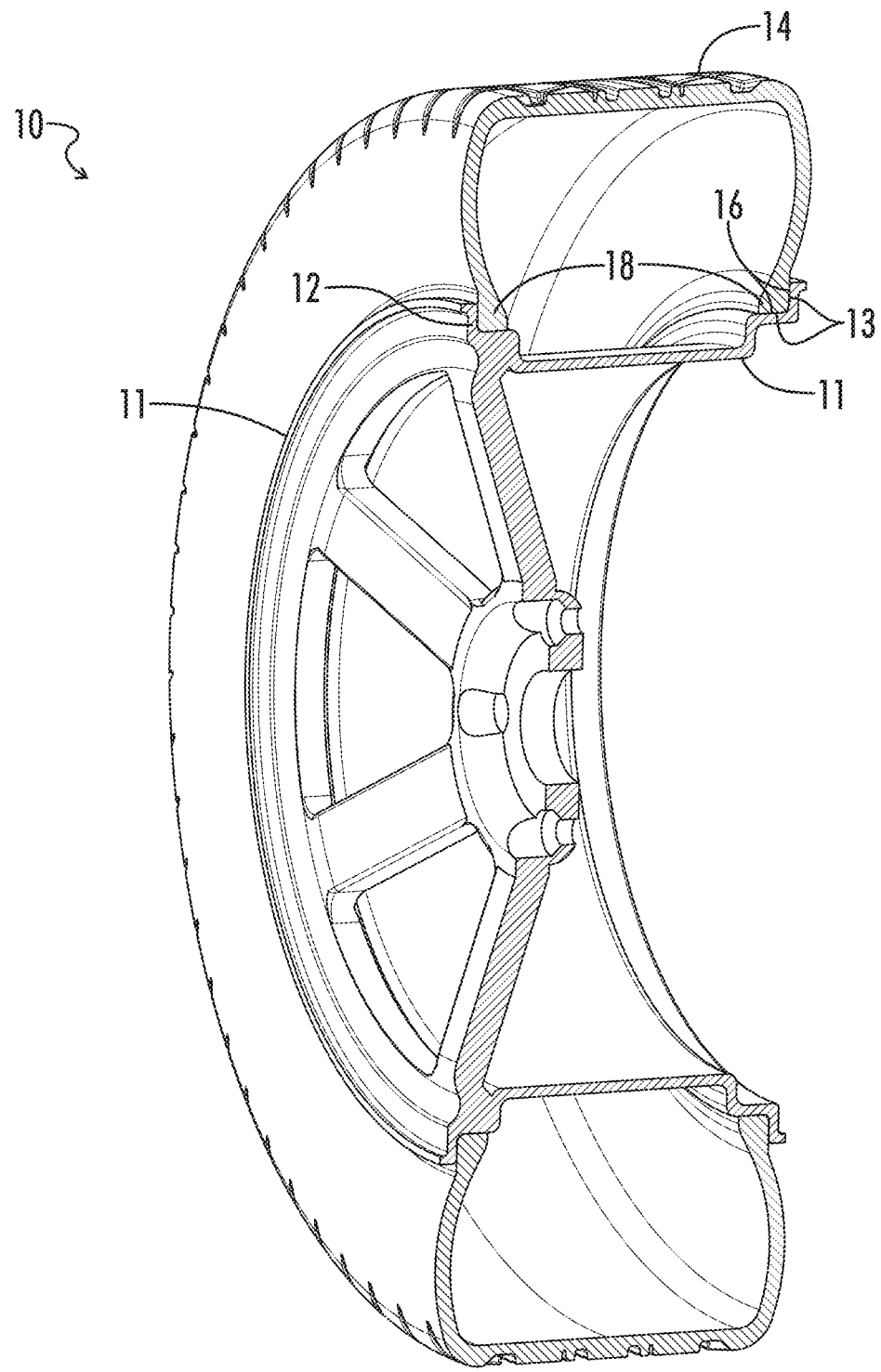
FIG. 1 is a perspective view of a wheel assembly, in accordance with the present disclosure.

Referring to FIG. 1, a wheel assembly 10 is shown. The wheel assembly 10 may include a wheel 11 and a tire 14. The wheel 11 may comprise one or more of the following materials: steel, aluminum, chrome, magnesium, any metallic alloy comprising any of the foregoing materials, and all other materials known to the manufacture, fabrication, and construction of the wheel 11. The tire 14 may comprise one or more of the following materials: natural rubber, synthetic polymers, steel, textile, fillers, antioxidants, antiozonants, curing systems, and all other materials known to the manufacture, fabrication, and construction of the tire 14. The wheel 11 may have a rim 12 positionally located at a wheel outer perimeter 13 of the wheel 11. The tire 14 is mounted, affixed, cast, or otherwise sealed about the wheel 11, such that when the tire 14 is inflated with a fluid, such as air, the tire 14 is fixedly secured about the wheel 11. The tire 14 may have a tire bead 18 positionally located at a tire inner perimeter 16. When the tire 14 is inflated, the tire bead 18 may sit, or slot, within a groove or trench within the rim 12.

Figure 2A:
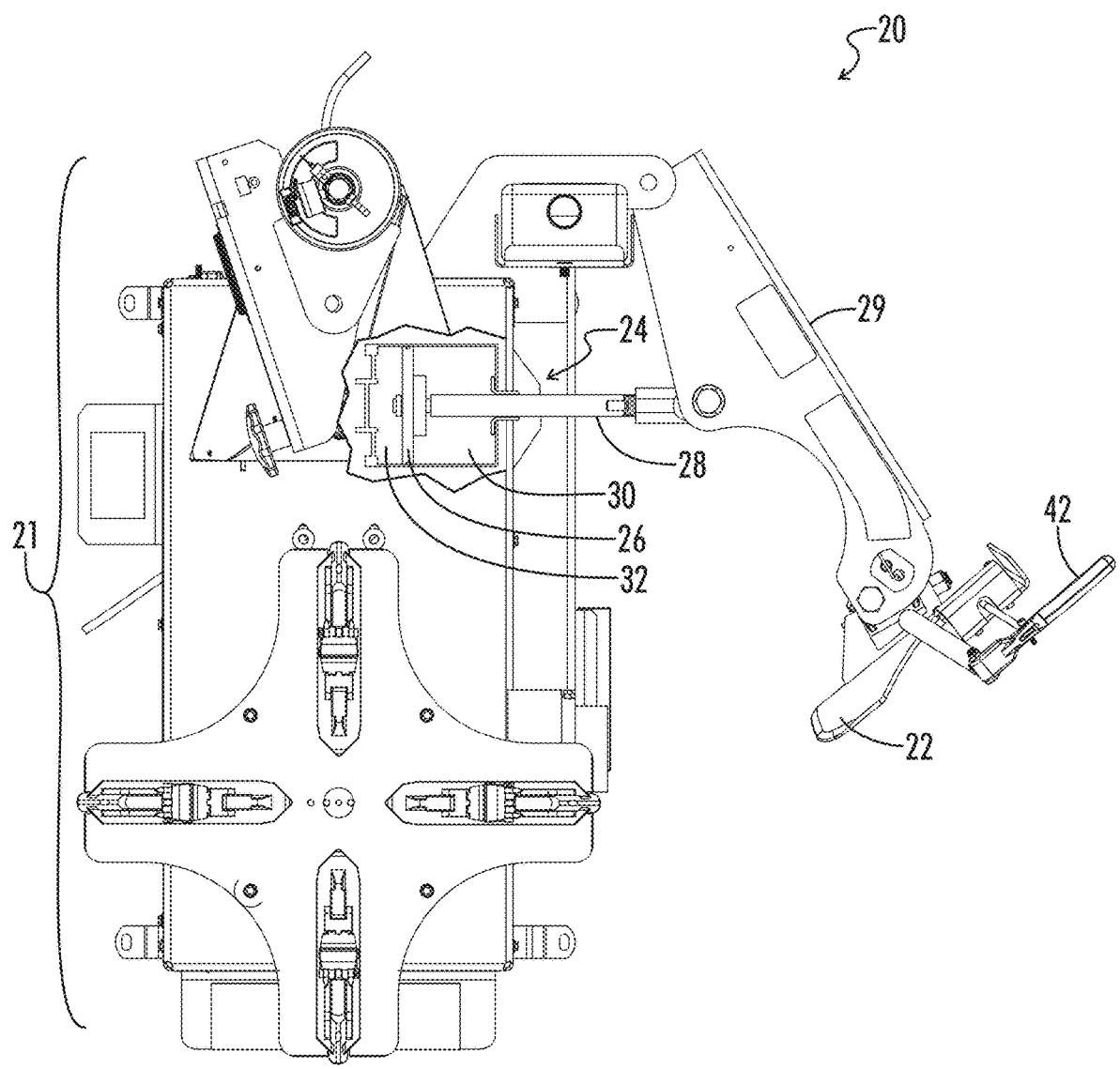
FIG. 2A is a perspective view of a tire-bead loosener, in accordance with the present disclosure.
Figure 2B:
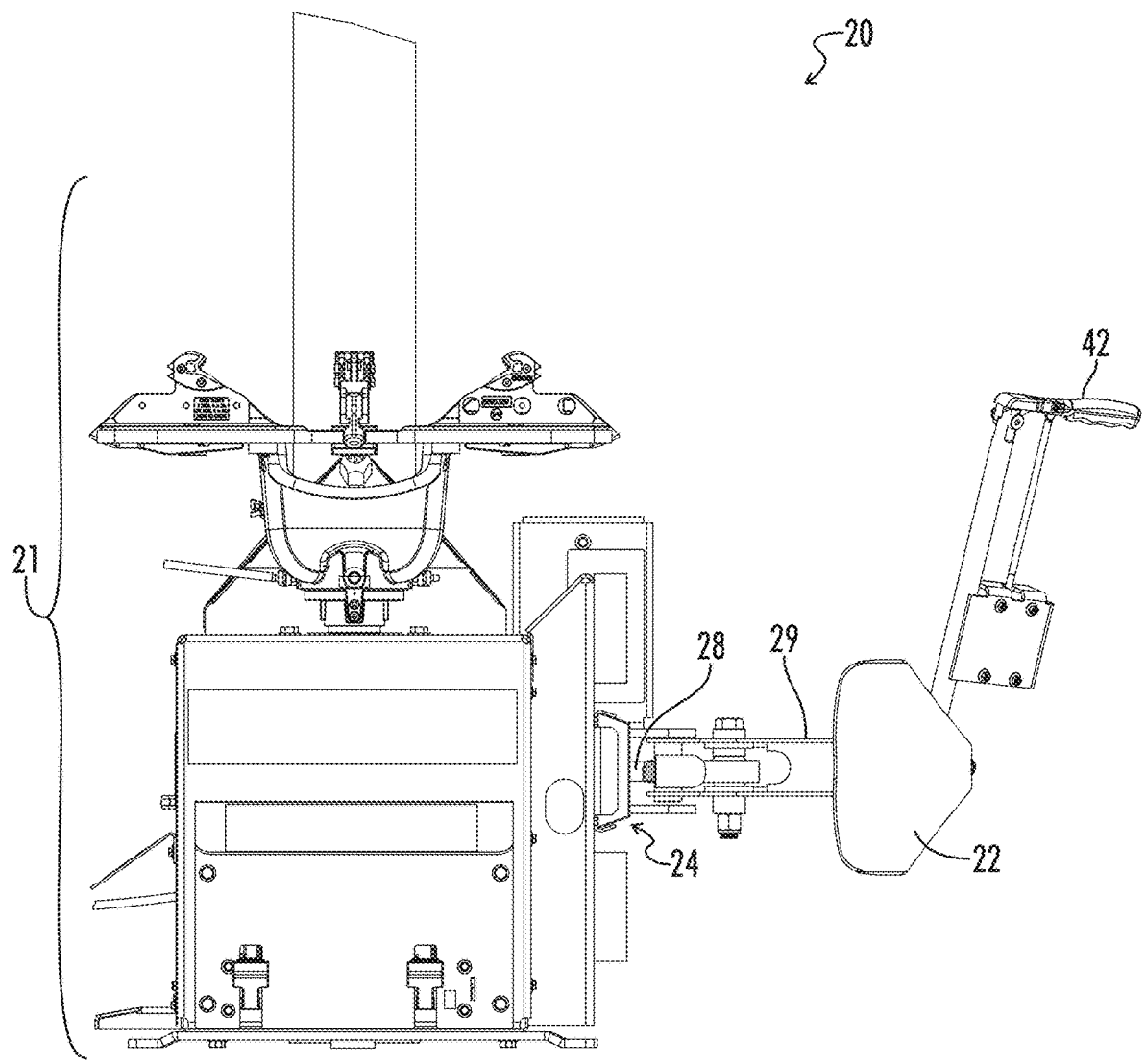
FIG. 2B is a perspective view of the tire-bead loosener, in accordance with the present disclosure.
Figure 3:
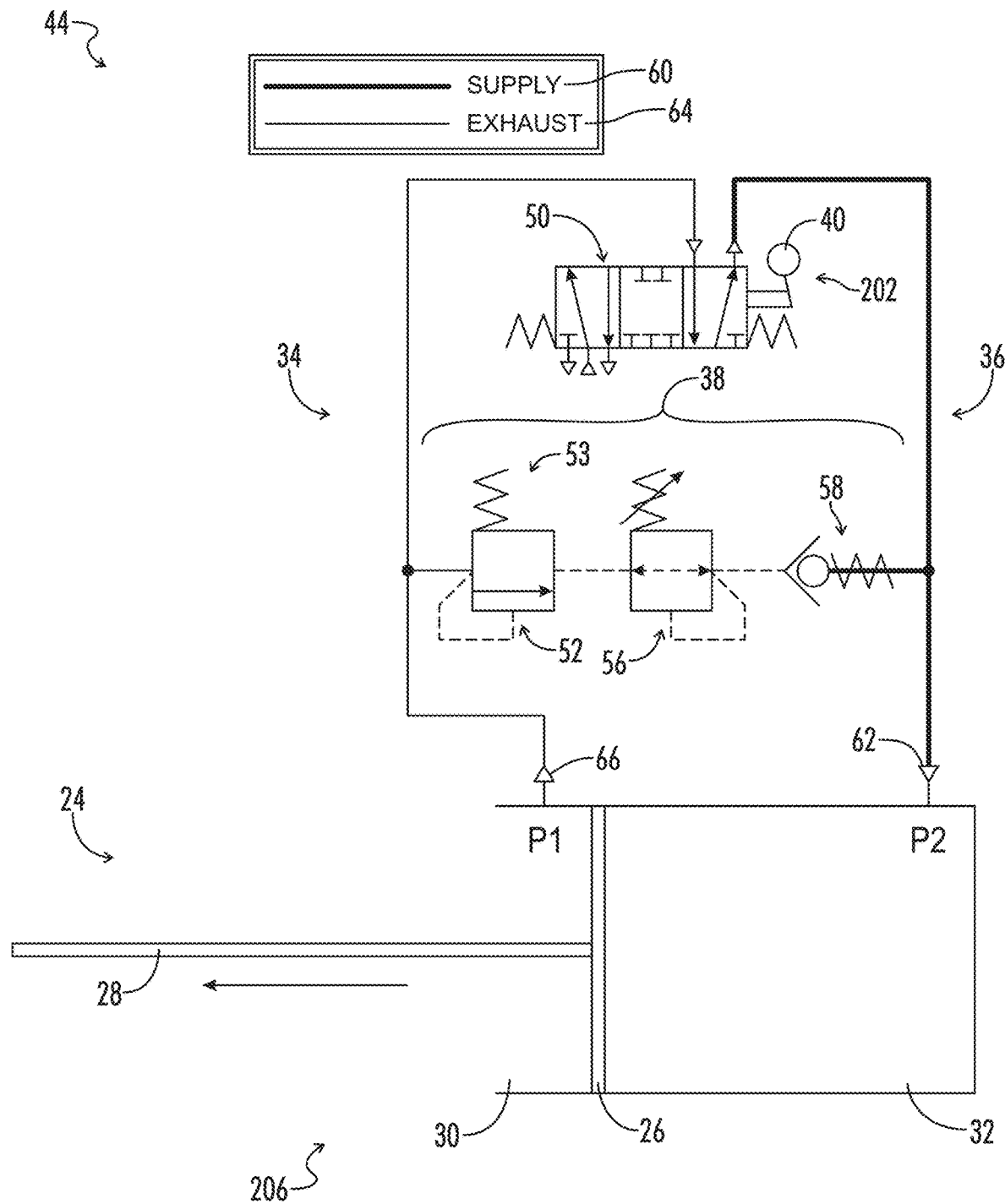
FIG. 3 is a schematic of an embodiment of a tire-bead loosening system, where a piston housed within a cylinder is in an extended position, in accordance with the present disclosure.
Figure 4:
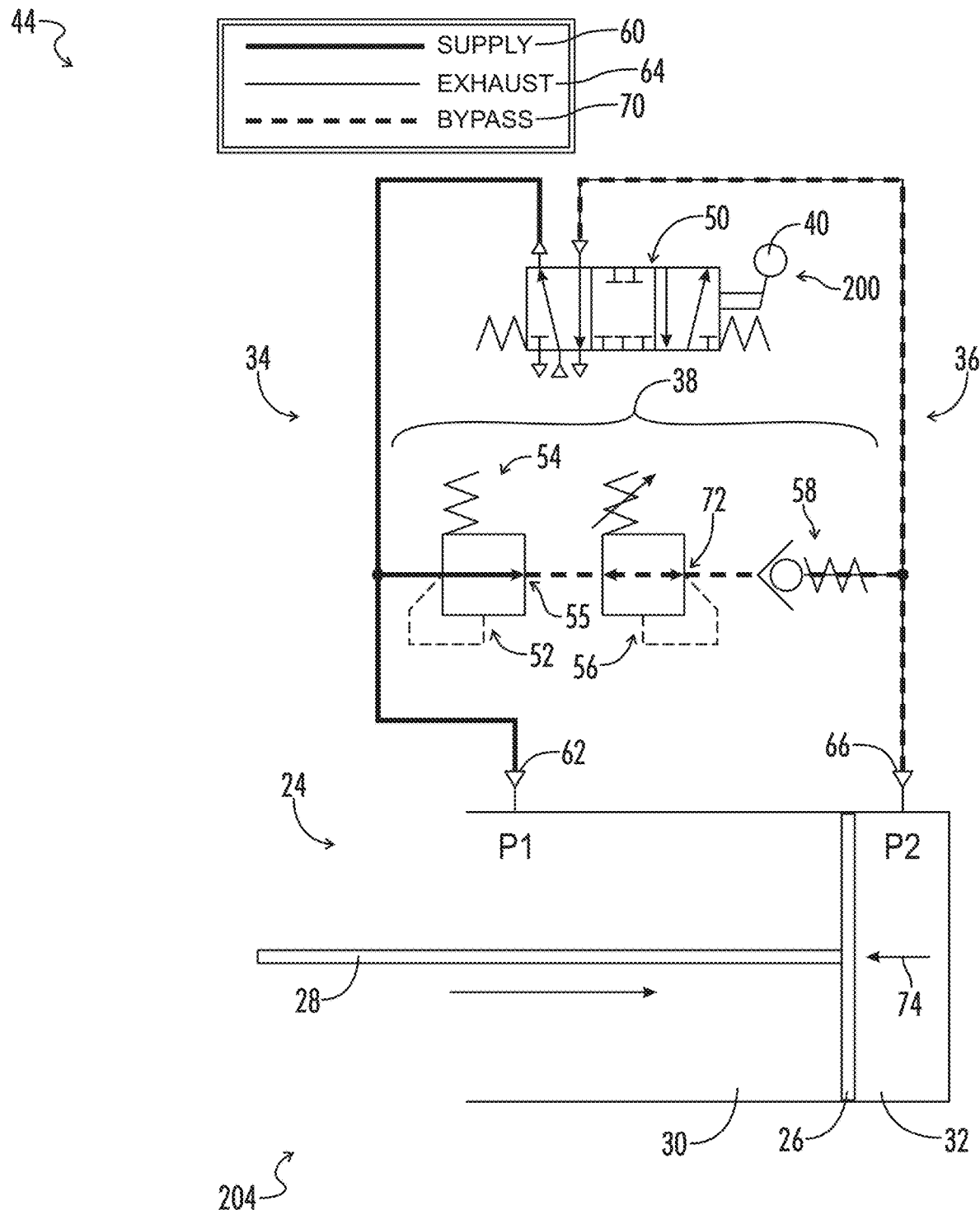
FIG. 4 is a schematic of an embodiment of a tire-bead loosening system, where a piston housed within a cylinder is in a retracted position, in accordance with the present disclosure.

Referring to FIGS. 2A-2B, an embodiment of a tire-bead loosener 20 is shown. As depicted in FIG. 2A, one or more shoes 22 may be pivotably connected to an end of an arm 29. The arm 29 may be connected to a piston 26 having a connecting rod 28. In optional embodiments, a handle 42 may be attached to a lever 40, and the handle 42 may be configured to operate the lever 40 between a lever first position 200 and a lever second position 202, as depicted in FIGS. 3-4. Referring to FIG. 2A, an operator may grip, control, or operate the handle 42 so as to move the one or more shoes 22 in proximity to the tire inner perimeter 16 of the tire 14, the tire 14 mounted or affixed to the wheel 11. In moving the one or more shoes 22 in proximity to the tire inner perimeter 16 of the tire 14, the one or more shoes 22 may slidably wedge into the inner perimeter 16 of the tire 14 and may loosen the tire bead 18 of the tire 14. Where the one or more shoes 22 are moved in proximity to, or in the direction of, the tire inner perimeter 16 of the tire 14, the arm 29 may be pivotably moved in proximity to the tire-changing machine 21, and the connecting rod 28 of the piston 26 may retract or compress into the cylinder 24. Where the one or more shoes 22 are moved away from the tire inner perimeter 16 of the tire 14, the arm 29 may be pivotably moved away from the tire-changing machine 21, and the connecting rod 28 of the piston 26 may extend or contract out of the cylinder 24.

Referring to FIG. 2B, an interior of the cylinder 24 is shown. The cylinder 24 may house the piston 26 having the connecting rod 28. The piston 26 may separate the cylinder 24 into a cylinder first port 30 and a cylinder second port 32. The cylinder first port 30 may also be referred to as a "drive" or "power" port of the cylinder 24, and the cylinder second port 32 may also be referred to as a "damped" port of the cylinder 24. The cylinder first port 30 may be defined by a side of the cylinder 24 proximate to the connecting rod 28 of the piston 26. The cylinder second port 32 may be defined by a side of the cylinder 24 not proximate to the connecting rod 28 of the piston 26. As demonstrated in FIGS. 3-4, where the handle 42 operates the lever 40 to the lever first position 200, the piston 26 may retract or compress into the cylinder 24, such that the lever first position 200 may correspond to a piston retracted position 204. Where the handle 42 operates the lever 40 to the lever second position 202, the connecting rod 28 of the piston 26 may extend or retract out of the cylinder 24, such that the lever first position 200 may correspond to a piston extended position 206.

FIGS. 2A-2B depict exemplary embodiments of the tire-bead loosener 20, as disclosed herein. It is understood that the tire-bead loosener 20 may be a vertical tire-bead loosener or a horizontal tire-bead loosener. In the horizontal tire-bead loosener, the one or more shoes 22 may be moved in proximity to, or in contact with, the tire inner perimeter 16. It is understood that the one or more shoes 22 may comprise one or more discs as is common to, or customary with, the horizontal tire-bead loosener. Where the handle 42 is operated to configure the lever 40 in the lever first position 200, a fluid, such as air, is supplied to the cylinder first port 30 of the cylinder 24, while the wheel assembly 10 is rotated atop a table, desk, or station of the tire-changing machine 21. During a rotation of the wheel assembly 10, pressure may be steadily and increasingly applied against the tire inner perimeter 16 of the tire 14 through the one or more shoes 22. Where sufficient pressure has been applied rotatably about the tire inner perimeter 16 of the tire 14, the tire bead 18 of the tire 14 may be dislodged or loosened from the rim 12 of the tire 14, such that the tire 14 can be removed from the wheel 11 to which the tire 14 is affixed or mounted.

In the vertical tire-bead loosener, the one or more shoes 22 may be moved in proximity to, or in contact with, the tire inner perimeter 16. Where the handle 42 is operated to configure the lever 40 in the first lever position 200, a fluid, such as air, is supplied to the cylinder first port 30 of the cylinder 24, while the wheel assembly 10 is positionally located adjacent to the tire-changing machine 21. A location on the tire inner perimeter 16 of the tire 14 is identified, and pressure is applied against the location on the tire inner perimeter 16 of the tire 14. Pressure is applied against additional locations, as necessary, on the tire inner perimeter 16 of the tire 14 until the tire 14 is dislodged or loosened from the rim 12 of the tire 14, such that the tire 14 can be removed from the wheel 11 to which the tire 14 is affixed or mounted. Again, the present disclosure is not intended to limit, or be limiting, with respect to the vertical tire-bead loosener or the horizontal tire-bead loosener; the present disclosure covers embodiments of the tire-bead loosener 20, including, but not limited to, the vertical tire-bead loosener and the horizontal tire-bead loosener.

Referring to FIGS. 3-4, a dampening system 44 for the tire-bead loosener 20 is shown. In the dampening system 44, an operation valve 50 may be configured to channel a supply flow 60 of fluid, such as air, nitrogen, or other fluid, into the cylinder 24, and the operation valve 50 may be configured to channel an exhaust flow 64 of the fluid out of the cylinder 24. The supply flow 60 of the fluid may have a supply flow pressure 62 and the exhaust flow 64 of the fluid may have an exhaust flow pressure 66. The lever 40 may be engaged to the operation valve 50. The lever 40 may be operable between the first lever position 200 and the lever second position 202. In the lever first position 200, and as further depicted in FIG. 4, the operation valve 50 may be configured to channel the supply flow 60 of the fluid through a first line 34 into the cylinder first port 30 of the cylinder 24. Where the lever 40 is operated to the lever first position 200, the piston 26 of the cylinder 24 may be in the piston retracted position 204. In the lever second position 202, and as further depicted in FIG. 3, the operation valve 50 may be configured to channel the supply flow 60 of the fluid through a second line 36 into the cylinder second port 32 of the cylinder 24. Where the lever 40 is operated to the lever second position 202, the piston 26 of the cylinder 24 may be in the piston extended position 206.

Referring to FIGS. 3-4, a pressure line 38 may connect the first line 34 to the second line 36. The pressure line 38 may include at least the following: a preset pressure relief valve 52, a pressure regulator 56, and a check valve 58. Along the pressure line 38: the preset pressure relief valve 52 may be in series with the pressure regulator 56; the preset pressure relief valve 52 may be in series with the check valve 58; the pressure regulator 56 may be in series with the check valve 58; the preset pressure relief valve 52 may be in series with the pressure regulator 56 and the check valve 58.

Referring to FIGS. 3-4, the preset pressure relief valve 52 may have, or oscillate between, a closed pressure relief valve position 53, as depicted in FIG. 3, and an open pressure relief valve position 54, as depicted in FIG. 4. The open pressure relief valve position 54 of the preset pressure relief valve 52 is actuated when the supply flow 60 achieves a preset pressure 55. In optional embodiments of the dampening system 44, the preset pressure 55 may range from about 90 pounds per square inch (psi) to about 150 pounds per square inch (psi). When the supply flow 60 achieves the preset pressure 55, the open pressure relief valve position 54 may be actuated, and the open pressure relief valve position 54 of the preset pressure relief valve 52 may be configured to channel a bypass flow 70 of the supply flow 60 from the first line 34 to the pressure regulator 56. The pressure regulator 56 may be operable to regulate, monitor, convert, normalize, or otherwise control the bypass flow 70 of the supply flow 60 to a damping pressure 72. The pressure regulator 56 may be configured to channel the bypass flow 70 of the supply flow 60 at the damping pressure 72 to the check valve 58. The check valve 58 may enable a single, one-way path, or channel, for the bypass flow 70 of the supply flow 60, such that the exhaust flow 64 may not channel into, or otherwise enter, the pressure line 38. Accordingly, the exhaust flow 64 in the second line 36 may not enter, or channel into, the pressure line 38, and thereby move into the first line 34 of the dampening system 44. The check valve 58 may be further configured to channel the bypass flow 70 of the supply flow 60 at the damping pressure 72 into the second line 36 of the dampening system 44.

Referring to FIG. 3, the piston 26 of the cylinder 24 in the piston extended position 206 is shown. The handle 42 may operate the lever 40 to the lever second position 202, the lever second position 202 corresponding to the piston extended position 206. In the lever second position 202, the operation valve 50 may channel the supply flow 60 of the fluid having the supply flow pressure 62 through the second line 36 and into the cylinder second port 32 of the cylinder 24, and the operation valve 50 may channel the exhaust flow 64 of the fluid having the exhaust flow pressure 66 through the first line 34 and out of the cylinder first port 30 of the cylinder 24. Where the lever 40 is operated to the lever second position 202, such that the piston 26 is in the piston extended position 206, the exhaust flow pressure 66 of the cylinder first port 30 of the cylinder 24 may approach a value of 0 pounds per square inch (psi). Where the handle 42 has operated the lever 40 to the lever second position 202, the one or more shoes 22 may not slidably wedge into the tire inner perimeter 16 of the tire 14 and loosen, or dislodge, the tire bead 18 of the tire 14. Importantly, where the lever 40 is operated to the lever second position 202, the closed pressure relief valve position 53 of the preset pressure relief valve 52 does not channel the bypass flow 70 of the exhaust flow 64 in the second line 36. Given that the exhaust flow pressure 66 of the cylinder first port 30 of the cylinder 24 may approach a value of 0 pounds per square inch (psi), the bypass flow 70 of the exhaust flow 64 in the second line 36 may not achieve the preset pressure 55 necessary to actuate the open pressure relief valve position 54 of the preset pressure relief valve 52. Therefore, in the lever second position 202, corresponding to the piston extended position 206, neither the supply flow 60 nor the exhaust flow 64 are channeled to, or travel within, the pressure line 38.

Referring to FIG. 4, the piston 26 of the cylinder 24 in the piston retracted position 204 is shown. The handle 42 may operate the lever 40 to the lever first position 200, the lever first position 200 corresponding to the piston retracted position 202. In the lever first position 200, the one or more shoes 22 may be in proximity to, or in contact with, the tire inner perimeter 16 of the tire 14. The operation valve 50 may channel the exhaust flow 64 of the fluid having the exhaust flow pressure 66 through the second line 36 out of the cylinder second port 32 of the cylinder 24, and the operation valve 50 may channel the supply flow 60 of the fluid having the supply flow pressure 62 from the first line 34 into the cylinder first port 30 of the cylinder 24. Where the supply flow pressure 62 of the supply flow 60 of the fluid achieves the preset pressure 55, the open pressure relief valve position 54 of the preset pressure relief valve 52 may channel the bypass flow 70 of the supply flow 60 from the first line 34 to the pressure regulator 56. The pressure regulator 56 may regulate, monitor, convert, normalize, or otherwise control the bypass flow 70 of the supply flow 60 to the damping pressure 72. The pressure regulator 56 may regulate the bypass flow 70 of the supply flow 60 at the damping pressure 72 to the check valve 58. In optional embodiments, the damping pressure 72 of the bypass flow 70 may range from about 10 pounds per square inch (psi) to about 50 pounds per square inch (psi).

The check valve 58 may receive the bypass flow 70 of the supply flow 60 at the damping pressure 72, and the check valve 58 may channel the bypass flow 70 at the damping pressure 72 from the pressure line 38 through the second line 36 and into the cylinder second port 32 of the cylinder 24. The damping pressure 72 of the bypass flow 70 in the cylinder second port 32 and the exhaust flow pressure 66 of the exhaust flow 64 in the cylinder second port 32 may provide, support, or deliver a pressure cushion 74 against the supply flow pressure 62 of the supply flow 60 in the cylinder first port 30. The one or more shoes 22 may slidably wedge into the tire inner perimeter 16 of the tire 14. In optional embodiments, the pressure cushion 74 may range from 55 pounds per square inch (psi) to 125 pounds per square inch (psi).

Figure 5:
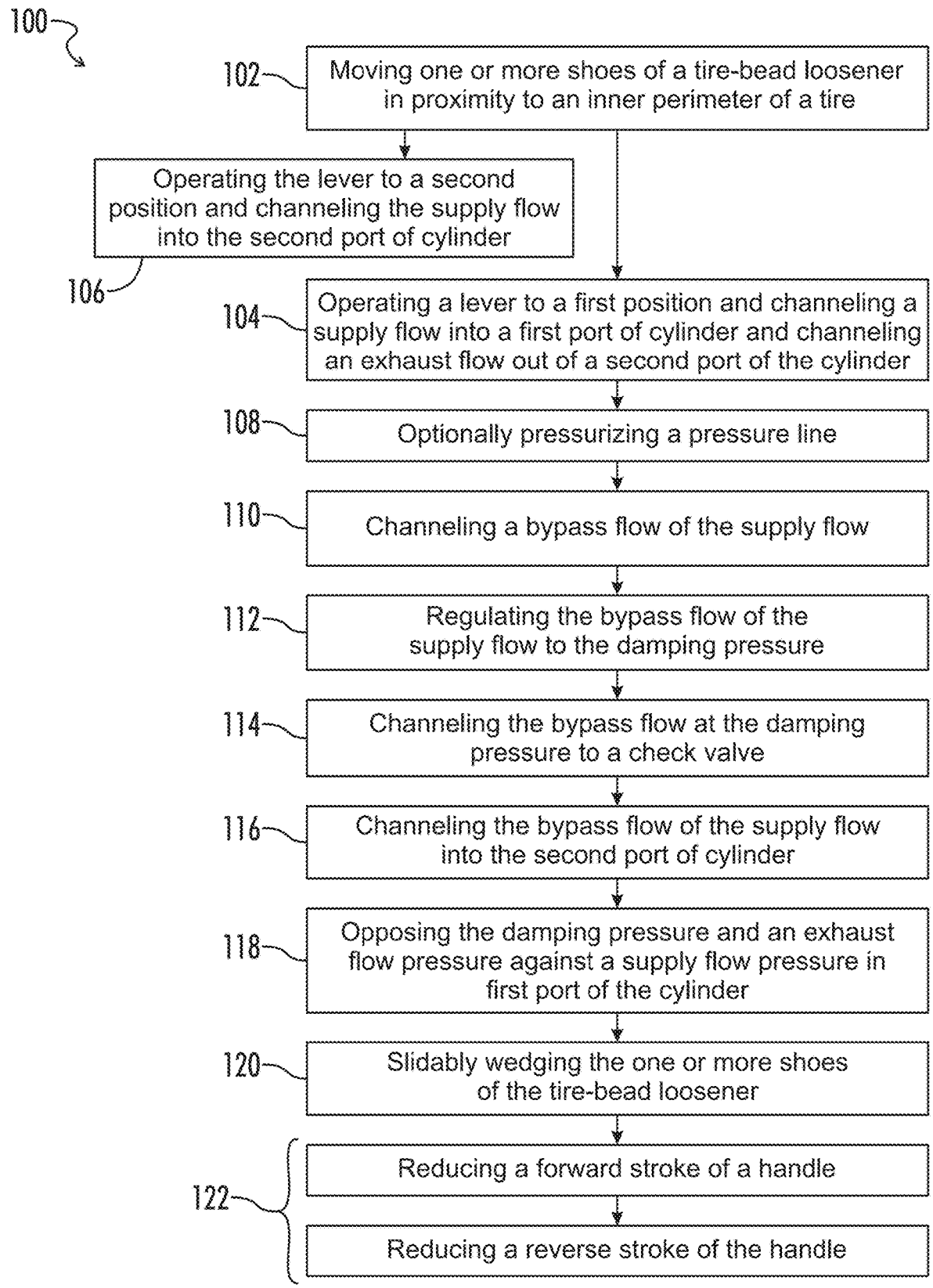
FIG. 5 is a flowchart representing an exemplary embodiment of a method, and exemplary aspects of another embodiment of the method, of dampening a tire-bead loosener, in accordance with the present disclosure.

Referring to FIG. 5, a flowchart of an exemplary embodiment of a method of dampening 100 the tire-bead loosener 20 is shown. For purpose of the disclosure herein, the method 100 may be read in conjunction with the disclosure of the tire-bead loosener 20 where the lever 40 is operated in the lever first position 200, as in FIG. 4, and where the lever 40 is operated in the lever second position 202, as in FIG. 3. The method 100 may commence with a step 102 of moving the or more shoes 22 of the tire-bead loosener 20 in proximity to, or in contact with, the tire inner perimeter 16 of the tire 14. The tire-bead loosener 20 may include the arm 29, the one or more shoes 22, the piston 26, the cylinder 24, the lever 40, the operation valve 50, the preset pressure relief valve 52, the pressure regulator 56, and the check valve 58. Referring to FIGS. 2A-2B, the one or more shoes 22 may be pivotably connected to an end of the arm 29, and the arm 29 may be connected to the piston 26 of the cylinder 24. The piston 26 may be housed within the cylinder 24, and the piston 26 may have the connecting rod 28. The piston 26 may separate the cylinder 24 into the cylinder first port 30 and the cylinder second port 32. The cylinder first port 30 may be defined by a side of the cylinder 24 proximate to the connecting rod 28 of the piston 26. The operation valve 50 may be in communication with the cylinder 24, and the lever 40 may be engaged to the operation valve 50. In optional embodiments of the tire-bead loosener 20, the handle 42 may be attached the lever 40. The handle 42 may be configured to operate the lever 40 to the lever first position 200, corresponding to the piston retracted position 204, and the handle 42 may be configured to operate the lever 40 to the lever second position 202, corresponding to the piston extended position 206.

Referring to FIG. 5, the method 100 may continue with a step 104 of operating the lever 40 to the lever first position 200, corresponding to the piston retracted position 204, as depicted in FIG. 4. In the step 104, the operation valve 50 may channel the supply flow 60 of the fluid having the supply flow pressure 62 through the first line 34 into the cylinder first port 30 of the cylinder 24. In the step 104, the operation valve 50 may channel the exhaust flow 64 of the fluid having the exhaust flow pressure 66 through the second line 36 out of the cylinder second port 32 of the cylinder 24.

In optional embodiments, the method 100 may continue with a step 106 of operating the lever 40 to the lever second position 202, corresponding to the piston extended position 206, as depicted in FIG. 3. In the step 106, the operation valve 50 may channel the supply flow 60 of the fluid through the second line 36 into the cylinder second port 32, and the operation valve 50 may channel the exhaust flow 64 of the fluid through the first line 34 out of the cylinder first port 30. The exhaust flow pressure 66 of the cylinder first port 30 of the cylinder 24 may approach a value of 0 pounds per square inch (psi). Given that the exhaust flow pressure 66 of the cylinder first port 30 of the cylinder 24 may approach a value of 0 pounds per square inch (psi), the bypass flow 70 of the exhaust flow 64 in the second line 36 may not achieve the preset pressure 55 necessary to actuate the open pressure relief valve position 54 of the preset pressure relief valve 52. Therefore, in the lever second position 202, corresponding to the piston extended position 206, neither the supply flow 60 nor the exhaust flow 64 are channeled to, or travel within, the pressure line 38.

Referring to FIG. 5, where the lever 40 is operated to the lever first position 200, corresponding to the piston retracted position 204, as depicted in FIG. 4, the method 100 may continue with a step 108 of optionally pressurizing the pressure line 38. As conveyed in an embodiment of the dampening system 44 in FIGS. 3-4, the pressure line 38 may connect the first line 34 to the second line 36. The pressure line 38 may include at least the following: the preset pressure relief valve 52, a pressure regulator 56, and the check valve 58. Along the pressure line 38: the preset pressure relief valve 52 may be in series with the pressure regulator 56; the preset pressure relief valve 52 may be in series with the check valve 58; the pressure regulator 56 may be in series with the check valve 58; the preset pressure relief valve 52 may be in series with the pressure regulator 56 and the check valve 58.

Referring to FIG. 5, the method 100 may continue with a step 110 of channeling the bypass flow 70 of the supply flow 60 through the open pressure relief valve position 54 of the preset pressure relief valve 52. Until the bypass flow 70 of the supply flow 60 achieves the preset pressure 55, the preset pressure relief valve 52 may remain in the closed pressure relief valve position 53 of the preset pressure relief valve 52. When the bypass flow 70 of the supply flow 60 achieves the preset pressure 55, the bypass flow 70 of the supply flow 60 may be channeled through the open pressure relief valve position 54 of the preset pressure relief valve 52 into the pressure line 38. In optional embodiments of the dampening system 44, the preset pressure 55 may range from about 90 pounds per square inch (psi) to about 150 pounds per square inch (psi).

The method 100 may continue with a step 112 of regulating, monitoring, converting, normalizing, or otherwise controlling the bypass flow 70 of the supply flow 60 to the damping pressure 72. In optional embodiments of the method 100, the step 112 of regulating, monitoring, converting, normalizing, or otherwise controlling the bypass flow 70 of the supply flow 60 to the damping pressure 72 may be accomplished by the pressure regulator 56. In optional embodiments of the method 100, the damping pressure 72 of the bypass flow 70 may be range from about 10 pounds per square inch (psi) to about 50 pounds per square inch (psi).

The method 100 may continue with a step 114 of channeling the bypass flow 70 of the supply flow 60 to the check valve 58. The check valve 58 may receive the bypass flow 70 of the supply flow 60 at the damping pressure 72. The method 100 may continue with a step 116 of channeling the channeling the bypass flow 70 of the supply flow 60 at the damping pressure 72 to the second line 36 and into the cylinder second port 32 of the cylinder 26. The check valve 58 may enable a single, one-way path, or channel, for the bypass flow 70 of the supply flow 60, such that the exhaust flow 64 may not channel into, or otherwise enter, the pressure line 38. Accordingly, the exhaust flow 64 in the second line 36 may not enter, or channel into, the pressure line 38, and thereby move into the first line 34 of the dampening system 44.

The method 100 may continue with a step 118 of opposing the damping pressure 72 of the bypass flow 70 in the cylinder second port 32 and the exhaust flow pressure 66 of the exhaust flow 64 in the cylinder second port 32 against the supply flow pressure 62 of the supply 60 in the cylinder first port 30. In optional embodiments of the method 100, the step 118 may yield the pressure cushion 74 between the damping pressure 72 of the bypass flow 70 in the cylinder second port 32 and the exhaust flow pressure 66 of the exhaust flow 64 in the cylinder second port 32 against the supply flow pressure 62 of the supply 60 in the cylinder first port 30. The pressure cushion 74 may range from 55 pounds per square inch (psi) to 125 pounds per square inch (psi).

Referring to FIG. 5, in optional embodiments, the method 100 may continue with a step 120 of slidably wedging the one or more shoes 22 into the tire inner perimeter 16 of the tire 14. Upon slidably wedging the one or more shoes 22 into the tire inner perimeter 16 of the tire 14, the one or more shoes 22 may loosen, or dislodge, the tire bead 18 of the tire 14.

The method 100 may continue with a step 122 of reducing a forward stroke 210 of the handle 42 attached to the lever 40. As demonstrated in FIGS. 8A-8B and FIGS. 9A-10C, the forward stroke 210 of the handle 42 may be reduced from about 130 inches per second (in/s) to about 155 inches per second (in/s) when loosening the tire bead 18 of the tire 14, though in other embodiments, the velocity of the forward stroke may be further reduced. The step 122 may further include reducing a reverse stroke 212 of the handle 42 attached to the lever 40. As demonstrated in FIGS. 8A-8B and FIGS. 9A-10C, the reverse stroke 212 of the handle 42 may be reduced from about −80 inches per second (in/s) to about −175 inches per second (in/s) when loosening the tire bead 18 of the tire 14, though, in other embodiments, the velocity of the reverse stroke may be further reduced.

The method 100 may continue with the step 122 of reducing the forward stroke 210 of the handle 42 attached to the lever 40. As demonstrated in FIGS. 8A-8B and FIGS. 9A-10C, the forward stroke 210 of the handle 42 may be reduced by when loosening the tire bead 18 of the tire 14. Generally, this reduction may be at least about 20%, and generally at least about 40%, and in some instances may be about 46% as illustrated in FIG. 8B. The method 100 may also continue with the step 122 of reducing the reverse stroke 212 of the handle 42 attached to the lever 40. As demonstrated in FIGS. 8A-8B and FIGS. 9A-10C, the reverse stroke 212 of the handle 42 may be reduced when loosening the tire bead 18 of the tire 14. Generally, this reduction may be at least about 20%, and generally at least about 40%, and in some instances may be about 38% as illustrated in FIG. 8B.

Figure 6A:
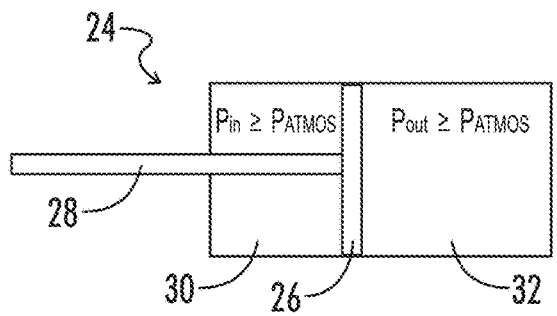
FIGS. 6A-6F is a perspective view of a piston housed within a cylinder moving from an extended position to a retracted position, in accordance with the present disclosure.
Figure 6B:
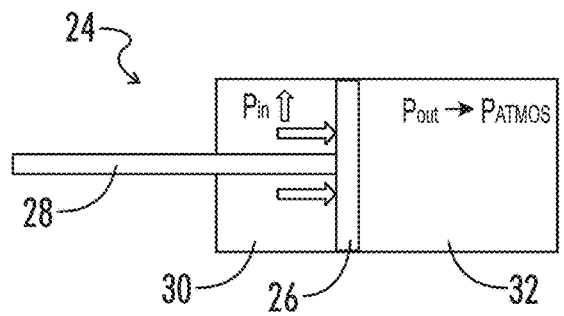

Referring to FIGS. 6A-6F, a cycle of the dampening system 44 is shown, where the lever 40 is operated from the lever second position 202, corresponding to the piston extended position 206, to the lever first position 200, corresponding to the piston retracted position 204. Referring to FIG. 6A, the lever 40 may be operated in the lever second position 202, corresponding to the piston extended position 206. Pressure in the cylinder first port 30 of the cylinder 24 and pressure in the cylinder second port 32 of the cylinder 24 is approximately equal to atmospheric pressure, and in optional embodiments, the pressure in the cylinder first port 30 of the cylinder port 24 and the pressure in the cylinder port 32 of the cylinder 24 may be greater than atmospheric pressure. Referring to FIG. 6B, the lever 40, to which in optional embodiments of the tire-bead loosener 20 the handle 42 is attached, has begun to be operated from the lever first position 200 to the lever second position 202. The operation valve 50 may channel the supply flow 60 of the fluid through the first line 34 and into the cylinder first port 30 of the cylinder 24.

Figure 6C:
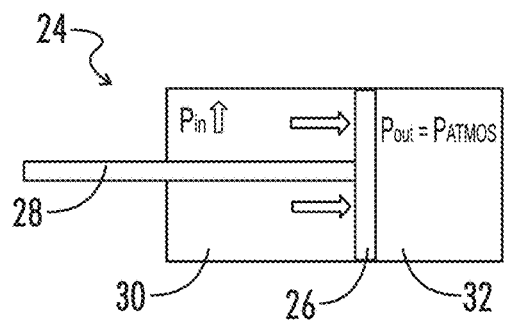
Figure 6D:
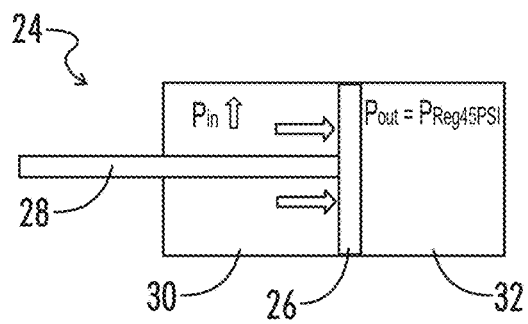

Referring to FIG. 6C, when the supply flow 60 of the fluid achieves the preset pressure 55, the open pressure relief valve position 54 of the preset pressure relief valve 52 channels the bypass flow 70 of the supply flow 60 of the fluid from the first line 34 to the pressure line 38. In optional embodiments of the dampening system 44, the preset pressure 55 may range from about 90 pounds per square inch (psi) to about 150 pounds per square inch (psi). Referring to FIG. 6D, the pressure regulator 56 may regulate, monitor, convert, normalize, or otherwise control the bypass flow 70 of the supply flow 60 to the damping pressure 72. In optional embodiments, the damping pressure 72 may range from about 10 pounds per square inch (psi) to about 50 pounds per square inch (psi), and in some instances, the damping pressure 72 may be 45 pounds per square inch (psi).

Figure 6E:
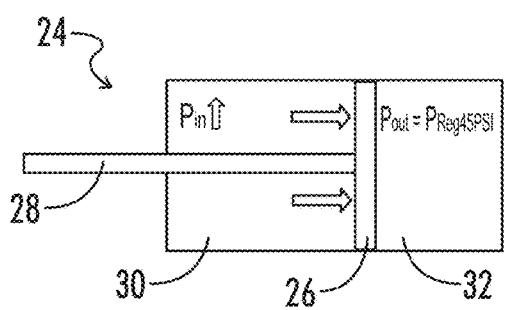

Referring to FIG. 6E, the lever 40 may be operated in the lever first position 200, corresponding to the piston retracted position 204. The pressure regulator 56 may regulate the bypass flow 70 of the supply flow 60 at the damping pressure 72 to the check valve 58. The check valve 58 may receive the bypass flow 70 of the supply flow 60 at the damping pressure 72, and the check valve 58 may channel the bypass flow 70 at the damping pressure 72 from the pressure line 38 through the second line 36 and into the cylinder second port 32 of the cylinder 24. The damping pressure 72 of the bypass flow 70 in the cylinder second port 32 and the exhaust flow pressure 66 of the exhaust flow 64 in the cylinder second port 32 may provide, support, or deliver the pressure cushion 74 against the supply flow pressure 62 of the supply flow 60 in the cylinder first port 30. In optional embodiments, the pressure cushion 74 may range from 55 pounds per square inch (psi) to 125 pounds per square inch (psi). The one or more shoes 22 may slidably wedge into the tire inner perimeter 16 of the tire 14.

Figure 6F:
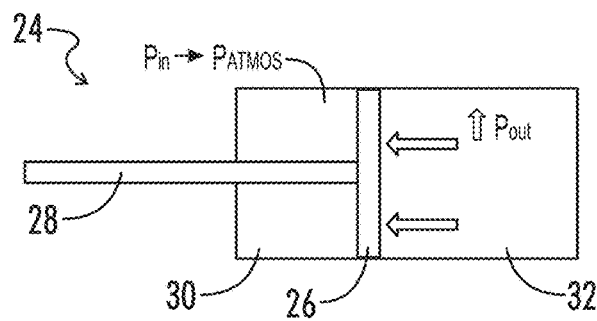

Referring to FIG. 6F, the lever 40 may be operated from the lever first position 200, corresponding to the piston retracted position 204, to the lever second position 202, corresponding to the piston extended position 206. In the lever second position 202, the operation valve 50 may channel the supply flow 60 of the fluid having the supply flow pressure 62 through the second line 36 and into the cylinder second port 32 of the cylinder 24, and the operation valve 50 may channel the exhaust flow 64 of the fluid having the exhaust flow pressure 66 through the first line 34 and out of the cylinder first port 30 of the cylinder 24. Where the lever 40 is operated to the lever second position 202, such that the piston 26 is in the piston extended position 206, the exhaust flow pressure 66 of the cylinder first port 30 of the cylinder 24 may approach a value of 0 pounds per square inch (psi). This action may end the cycle of the dampening system 44.

Figure 7:
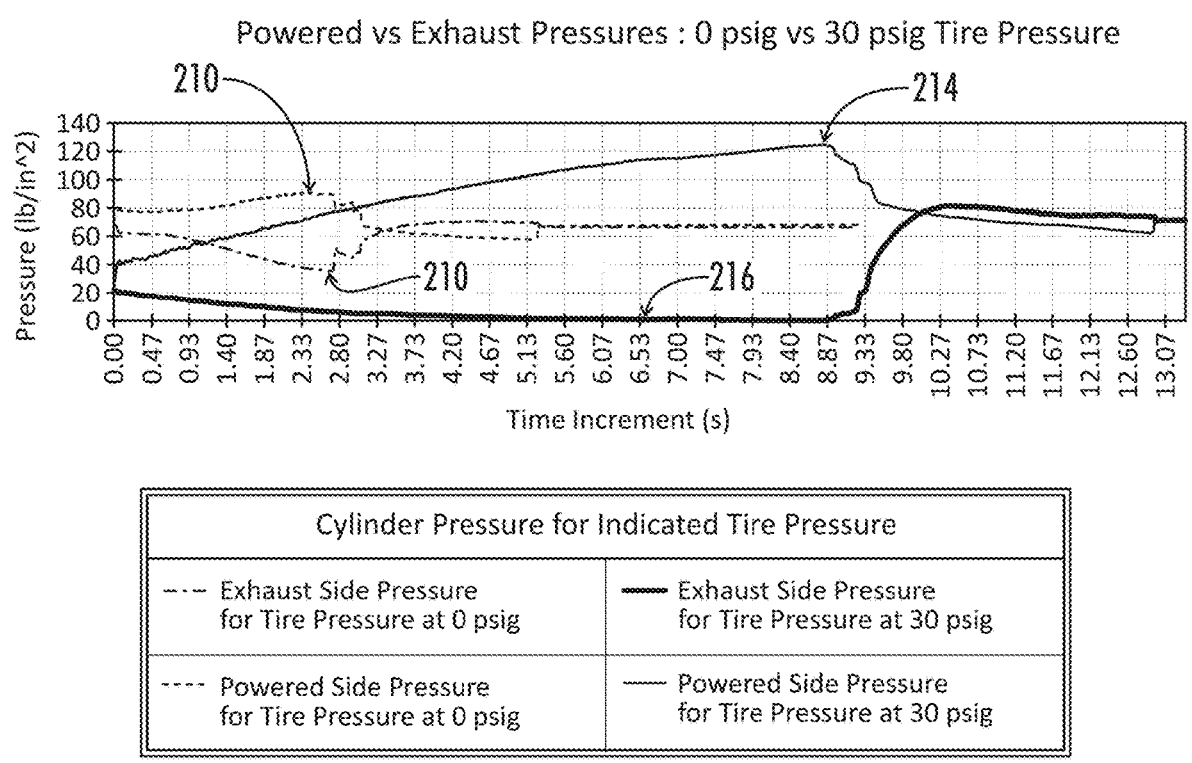
FIG. 7 is a graph of a supply flow pressure and an exhaust flow pressure for an inflated tire and a deflated tire when loosening a tire from a wheel assembly via a tire-bead loosener, in accordance with the present disclosure.

Referring to FIG. 7, a graph of the supply flow pressure 62 of the supply flow 60 and exhaust flow pressure 66 of the exhaust flow 64 is shown for an optional embodiment. The graph tracks data gathered when channeling the supply flow 60 having the supply flow pressure 62 into the cylinder first port 30 of the cylinder 24 and channeling the exhaust flow 64 having the exhaust flow pressure 66 out of the cylinder second port 32 of the cylinder 24. The graph tracks the supply flow pressure 62 and the exhaust flow pressure 66 when loosening, or dislodging, the tire bead 18 of the tire 14. Specifically, the graph tracks the supply flow pressure 62 and the exhaust flow pressure 66 for an inflated tire and a deflated tire.

In accordance with the graph of FIG. 7, pressure for the deflated tire is approximately 0 pounds per square inch gauge (psig), and pressure for the inflated tire is approximately 30 pounds per square inch gauge (psig). For the deflated tire, the supply flow pressure 62 achieves a maximum supply flow pressure 210 at approximately 91 pounds per square inch (psi) and the exhaust flow pressure 66 achieves a minimum exhaust flow pressure 212 at approximately 36 pounds per square inch. A difference between the maximum supply flow pressure 210 at approximately 91 pounds per square inch (psi) and the minimum exhaust flow pressure 212 at approximately 36 pounds per square inch (psi) yields a difference of about 55 pounds per square inch (psi).

Further in accordance with the graph of FIG. 7, for the inflated tire, the supply flow pressure 62 achieves a maximum supply flow pressure 214 at approximately 125 pounds per square inch (psi) and the exhaust flow pressure 66 achieves a minimum exhaust flow pressure 216 at approximately 0 pounds per square inch (psi). A difference between the maximum supply flow pressure 214 at approximately 125 pounds per square inch (psi) and the minimum exhaust flow pressure 216 at approximately 0 pounds per square inch (psi) yields a difference of about 125 pounds per square inch (psi). Accordingly, in ascertaining a value for the damping pressure 72, and the pressure cushion 74, a range from about 55 pounds per square inch (psi), for the deflated tire, to about 125 pounds per square inch (psi), for the inflated tire, establishes a baseline for a desired cushioning of pressure in the cylinder first port 30 against the cylinder second port 32. A pressure differential between the cylinder first port 30 and the cylinder second port 32 generally indicates a difference in stored potential energy in the deflated tire and the inflated tire, the potential energy being released upon loosening the tire bead 18 of the tire 14. An object of the dampening system 44 is to minimize the pressure differential, such that the potential energy released upon loosening the tire bead 18 of the tire 14 reduces the likelihood of the tire-bead loosener 20 and its constituent parts, such as the one or more shoes 22, from injuring the operator of the tire-bead loosener 20, damaging the tire-bead loosener 20, or damaging the wheel assembly 10.

Referring to FIG. 8A, a table providing measurements of the forward stroke 210 and the reverse stroke 212 of the handle 42, wherein the lever 40 is moved to the lever first position 200, corresponding to the piston retracted position 204, where the tire bead 18 of the tire 14 is loosened on the deflated tire, is provided for an optional embodiment. As demonstrated, in the tire-bead loosener 20 not employing the dampening system 44, an average velocity of the forward stroke 210 was approximately 285 inches per second (in/s) though, in other embodiments, the average velocity may be higher or lower. In the tire-bead loosener 20 employing the dampening system 44, an average velocity of the forward stroke 210 was approximately 130 inches per second (in/s), though, in other embodiments, the average velocity may be higher or lower. A percent reduction between the average velocity of the forward stroke 210 with the dampening system 44, as measured against the average velocity of the forward stroke 210 without the dampening system 44, may be approximately 50%, though, in other embodiments, the percent reduction may be higher or lower. As further demonstrated, in the tire-bead loosener 20 not employing the dampening system 44, an average velocity of the reverse stroke 212 was approximately −280 inches per second (in/s), though, in other embodiments, the average velocity may be higher or lower. In the tire-bead loosener 20 employing the dampening system 44, an average velocity of the reverse stroke 212 was approximately −80 inches per second (in/s), though, in other embodiments, the average velocity may be higher or lower. A percent reduction between the average velocity of the reverse stroke 212 with the dampening system 44, as measured against the average velocity of the reverse stroke 212 without the dampening system 44, is approximately 70%, though, in other embodiments, the percent reduction may be higher or lower.

Referring to FIG. 8B, a table providing measurements of the forward stroke 210 and the revere stroke 212 of the handle 42, wherein the lever 40 is moved to the lever first position 200, corresponding to the piston retracted position 204, where the tire bead 18 of the tire 14 is loosened on the inflated tire, is provided for an embodiment. As demonstrated with this embodiment, in the tire-bead loosener 20 not employing the dampening system 44, an average velocity of the forward stroke 210 was approximately 285 inches per second (in/s), though, in other embodiments, the average velocity may be higher or lower. In the tire-bead loosener 20 employing the dampening system 44 of this embodiment, an average velocity of the forward stroke 210 was approximately 155 inches per second (in/s), though, in other embodiments, the average velocity may be higher or lower. A percent reduction between the average velocity of the forward stroke 210 with the dampening system 44, as measured against the average velocity of the forward stroke 210 without the dampening system 44, may be at least about 20%, and generally at least about 40%, and in this embodiment is approximately 46%. As further demonstrated, in the tire-bead loosener 20 not employing the dampening system 44, an average velocity of the reverse stroke 212 was approximately −280 inches per second (in/s), though, in other embodiments, the average velocity may be higher or lower. In the tire-bead loosener 20 employing the dampening system 44, an average velocity of the reverse stroke 212 was approximately −175 inches per second (in/s), though, in other embodiments, the average velocity may be higher or lower. A percent reduction between the average velocity of the reverse stroke 212 with the dampening system 44, as measured against the average velocity of the reverse stroke 212 without the dampening system 44, may be at least about 20%, and generally at least about 40%, and in this embodiment is approximately 38%.

Referring to FIGS. 8A-8B, in compiling the data of the forward stroke 210 and the reverse stroke 212, wherein the lever 40 is moved to the lever first position 200, corresponding to the piston retracted position 204, where the tire bead 18 of the tire 14 is loosened on the inflated tire and the deflated tire, the dampening system 44 for the tire-bead loosener 20 exhibits substantial advancements over current models of the tire-bead loosener 20. The handle 42 of the lever 40 on the tire-bead loosener 20 may have a reduction in the forward stroke 210 from about 130 inches per second (in/s) to about 155 inches per second (in/s) in this embodiment though can be higher or lower in other embodiments. The handle 42 may have a reduction in the forward stroke 210 of at least about 20%, and generally at least about 40%, over the tire-bead loosener 20 not employing the dampening system 44, though in this embodiment was approximately 46%. The handle 42 of the lever 40 on the tire-bead loosener 20 may have a reduction in the reverse stroke 212 from about −80 inches per second (in/s) to about −175 inches per second (in/s), though, in other embodiments, the reduction may be higher or lower. The handle 42 may have a reduction in the reverse stroke 212 of at least about 20%, and generally at least about 40% over the tire-bead loosener 20 not employing the dampening system 44, though in this embodiment is about 38%. In summary, when moving the lever 40 to the lever first position 200, corresponding to the piston retracted position 204, so as to loosen the tire bead 18 of the tire 14 with the one or more shoes 22 of the tire-bead loosener 20, there is less movement, recoil, kickback, or shock on the tire-bead loosener 20 and the operator.

Figure 9A:
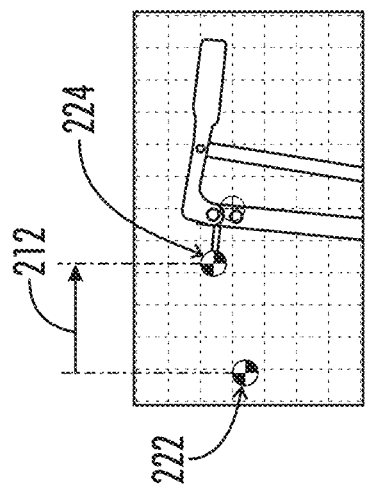
FIGS. 9A-9C is a perspective view of relative positions of handles on current models of a tire-bead loosener when the tire-bead loosener loosens the tire from a wheel assembly, in accordance with the present disclosure.
Figure 9B:
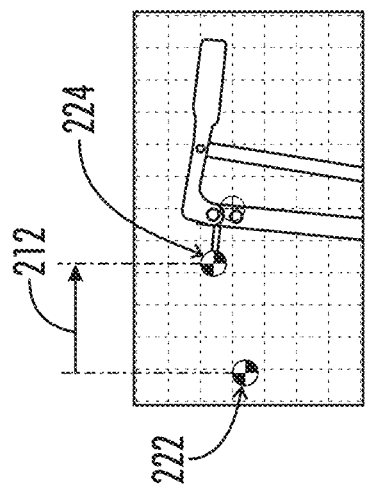
Figure 9C:
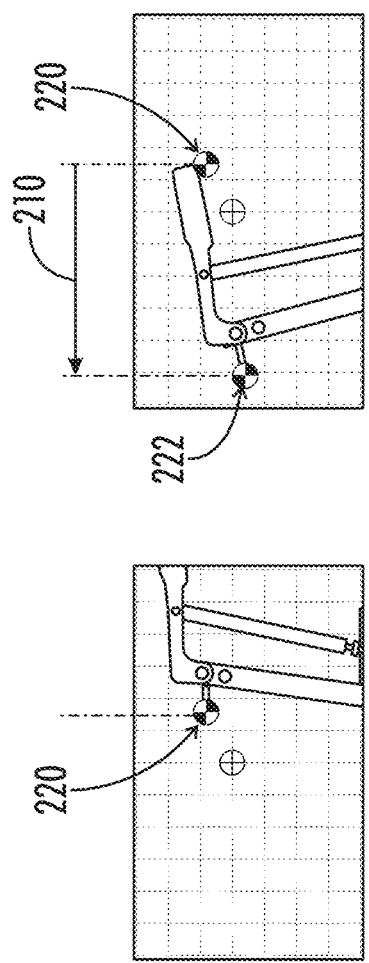

The advancement of the dampening system 44 is further demonstrated in FIGS. 9A-10C. Referring to FIG. 9A, the lever 40 is operated to the lever second position 202, corresponding to the piston extended position 206. Accordingly, the handle 42 attached to the lever 40 of the tire-bead loosener 20 is at a resting initial handle position 220. In FIGS. 9B-9C, the lever 40 is operated to the lever first position 200, corresponding to the piston retracted position 204, where the tire bead 18 of the tire 14 is loosened by the tire-bead loosener 20 not employing the dampening system 44. In FIG. 9B, the handle 42 is moved to a handle extension position 222 at an end of the forward stroke 210. The handle extension position 222 is approximately 12.9 inches from the resting initial handle position 220. In FIG. 9C, the handle 42 is moved to a handle rebound position 224 at an end of the reverse stroke 212. The handle rebound position 224 is this embodiment is approximately 6.7 inches from the handle extension position 222.

Figure 10A:
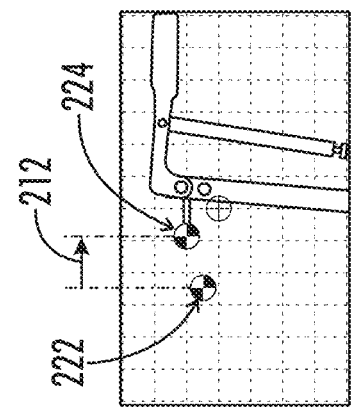
FIGS. 10A-10C is a perspective view of relative positions of handles on an embodiment of a tire-bead loosener when the tire-bead loosener loosens the tire from a wheel assembly and a dampening system is applied to the tire-bead loosener, in accordance with the present disclosure.
Figure 10B:
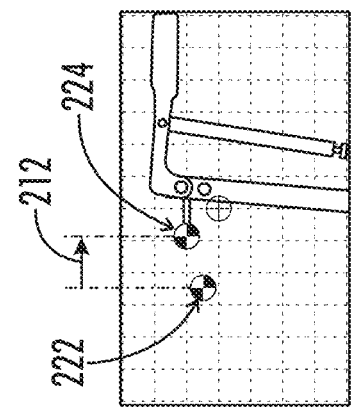
Figure 10C:
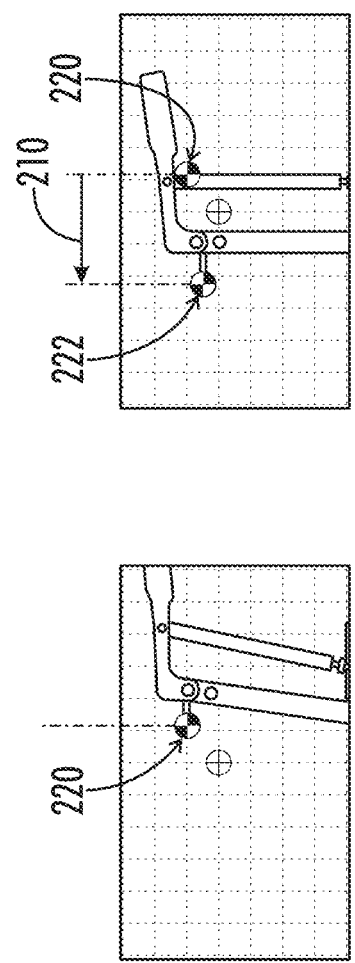

Referring to FIG. 10A, the lever 40 is operated to the lever second position 202, corresponding to the piston extended position 206. Accordingly, the handle 42 attached to the lever 40 of the tire-bead loosener 20 is at the resting initial handle position 220. In FIGS. 10B-10C, the lever 40 is operated to the lever first position 200, corresponding to the piston retracted position 204, where the tire bead 18 of the tire 14 is loosened by the tire-bead loosener 20 employing the dampening system 44. In FIG. 10B, the handle 42 is moved to the handle extension position 222 at the end of the forward stroke 210. The handle extension position 222 is approximately 6.7 inches from the resting initial handle position 220 in this embodiment. In FIG. 10C, the handle 432 is moved to the handle rebound position 224 at the end of the reverse stroke 212. The handle rebound position 224 is approximately 3.1 inches from the handle extension position 222 in this embodiment.

In compiling measurements from FIGS. 9A-10C regarding the handle extension position 222 and the handle rebound position 224. In the tire-bead loosener 20 with the dampening system 44, there is a difference of approximately 6.3 inches where the handle 42 is moved from the resting initial handle position 220 to the handle extension position 222 during the forward stroke 210. Moreover, in the tire-bead loosener 20 with the dampening system 44, there is a difference of approximately 3.6 inches where the handle 42 is moved from the handle extension position 222 to the handle rebound position 224 during the reverse stroke 212 for this embodiment. The difference of the handle extension position 222 and the handle rebound position 224 between the tire-bead loosener 20 employing the dampening system 44 and the tire-bead loosener 20 not employing the dampening system 44 evinces a reduction in movement, recoil, kickback, or shock caused by loosening the tire bead 18 of the tire 14. The reduction may mitigate or deter an event of injury to the operator by way of unnecessary shock and recoil, and the reduction may prevent, deter, or mitigate an event of damage to the tire-bead loosener 20 or the wheel assembly 10.

To facilitate the understanding of the embodiments described herein, a number of terms have been defined above. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful DAMPENING SYSTEM FOR A TIRE-BEAD LOOSENER, it is not intended that such references be construed as limitations upon the scope of this disclosure except as set forth in the following claims.

What is claimed is:

1. A dampening system for a tire-bead loosener, the dampening system comprising:
a cylinder housing a piston with a connecting rod, the piston separating the cylinder into a first port and a second port, the first port defined by a side of the cylinder proximate to the connecting rod;
the piston of the cylinder connected to an arm, the arm pivotably connected to one or more shoes and configured to move the one or more shoes in proximity to an inner perimeter of a tire on a wheel, the one or more shoes operable to slidably wedge into the inner perimeter of the tire and configured to loosen a bead of the tire;
an operation valve configured to channel a supply flow of a fluid into the cylinder and an exhaust flow of the fluid out of the cylinder, the supply flow having a supply flow pressure and the exhaust flow having an exhaust flow pressure;
a lever engaged to the operation valve, the lever operable between an first position and a second position, wherein the first position of the lever, the operation valve is configured to channel the supply flow of the fluid through a first line into the first port of the cylinder corresponding to a retracted position of the piston, and wherein the second position of the lever, the operation valve is configured to channel the supply flow of the fluid through a second line into the second port of the cylinder corresponding to an extended position of the piston;
a pressure line connecting the first line to the second line, the pressure line including a preset pressure relief valve, a pressure regulator, and a check valve, the preset pressure relief valve in series with the pressure regulator, the preset pressure relief valve and the pressure regulator in series with the check valve;
the preset pressure relief valve having a closed pressure relief valve position and an open pressure relief valve position, the open pressure relief valve position dependent upon a preset pressure, the open pressure relief valve position operable to channel a bypass flow of the supply flow from the first line to the pressure regulator;
the pressure regulator operable to regulate the bypass flow to a damping pressure, and configured to channel the bypass flow at the damping pressure to a check valve; and
the check valve configured to receive the bypass flow at the damping pressure, and further configured to channel the bypass flow at the damping pressure into the second line;
where the lever is in the second position, the operation valve channels the supply flow of the fluid through the second line into the second port and the operation valve channels the exhaust flow of the fluid through the first line out of the first port, such that the exhaust flow pressure of the first port approaches a value of 0 pounds per square inch (psi); and
where the lever is in the first position, the one or more shoes is in proximity to the inner perimeter of the tire, and the operation valve channels the exhaust flow of the fluid through the second line out of the second port, the operation valve channels the supply flow of the fluid through the first line into the first port of the cylinder, and the open pressure relief valve position of the preset pressure relief valve channels the bypass flow of the supply flow from the first line to the pressure regulator, the pressure regulator regulates the bypass flow to the damping pressure and the pressure regulator channels the bypass flow at the damping pressure to the check valve, and the check valve receives the bypass flow of the supply flow at the damping pressure and channels the bypass flow at the damping pressure through the second line into the second port, the damping pressure and exhaust flow pressure of the second port providing a pressure cushion against the supply flow pressure of the first port, such that the one or more shoes slidably wedge into the inner perimeter of the tire and loosen the bead of the tire.

2. The dampening system of claim 1, wherein:
the tire-bead loosener is a vertical tire-bead loosener or a horizontal tire-bead loosener.

3. The dampening system of claim 1, wherein:
the damping pressure ranges from about 10 pounds per square inch (psi) to about 50 pounds per square inch (psi).

4. The dampening system of claim 1, wherein:
the pressure cushion is in the range from about 55 pounds per square inch (psi) to about 125 pounds per square inch (psi).

5. The dampening system of claim 1, further comprising:
a handle attached to the lever, the handle configured to operate the lever between the first position and the second position.

6. The dampening system of claim 5, wherein:
the lever is in the first position, such that the one or more shoes slidably wedge into the inner perimeter of the tire and loosen the bead of the tire; and
the handle has a reduced forward stroke from about 130 in/s to about 155 in/s.

7. The dampening system of claim 6, wherein:
the handle has a reduced reverse stroke from about −80 in/s to about −175 in/s.

8. The dampening system of claim 5, wherein:
the lever is in the first position, such that the one or more shoes slidably wedge into the inner perimeter of the tire and loosen the bead of the tire; and
the handle has a reduced forward stroke of at least about 20%.

9. The dampening system of claim 5, wherein:
the lever is in the first position, such that the one or more shoes slidably wedge into the inner perimeter of the tire and loosen the bead of the tire; and
the handle has a reduced reverse stroke of at least about 20%.

10. A method of dampening a tire-bead loosener, the method comprising the steps of:
a) moving one or more shoes of the tire-bead loosener in proximity to an inner perimeter of a tire on a wheel, the tire-bead loosener including:
an arm pivotably connected to the one or more shoes, and the arm connected to a piston of a cylinder;
the cylinder housing the piston, the piston having a connecting rod, and the piston separating the cylinder into a first port and a second port, the first port defined by a side of the cylinder proximate to the connecting rod;
an operation valve in communication with the cylinder; and
a lever engaged to the operation valve;
b) operating the lever to a first position, wherein the operation valve channels a supply flow of a fluid having a supply flow pressure through a first line into the first port of the cylinder and the operation valve channels an exhaust flow of the fluid having an exhaust flow pressure through a second line out of the second port;

c) selectively pressurizing a pressure line where the lever is operated to the first position, the pressure line connecting the first line to the second line, the pressure line including a preset pressure relief valve, a pressure regulator, and a check valve, the preset pressure relief valve in series with the pressure regulator, and the preset pressure relief valve and the pressure regulator in series with the check valve;

d) channeling a bypass flow of the supply flow of the fluid from the first line through an open pressure relief valve position of the preset pressure relief valve when the supply flow of the fluid achieves a preset pressure;

e) regulating the bypass flow to a damping pressure;

f) channeling the bypass flow at the damping pressure to the check valve, the check valve receiving the bypass flow of the supply flow at the damping pressure;

g) channeling the bypass flow at the damping pressure to the second line and into the second port of the cylinder, and h) opposing the damping pressure and the exhaust flow pressure of the second port against the supply flow pressure of the first port.

11. The method of claim 10, wherein:
step e) further comprises regulating the bypass flow to the damping pressure via the pressure regulator.

12. The method of claim 10, further comprising:
i) slidably wedging the one or more shoes into the inner perimeter of the tire and loosening a bead of the tire.

13. The method of claim 12, further comprising:
a handle attached to the lever, the handle configured to operate the lever to the first position.

14. The method of claim 13, further comprising:
j) reducing a forward stroke of the handle from about 130 in/s to about 155 in/s when loosening the bead of the tire.

15. The method of claim 14, wherein:
the step j) further comprises reducing a reverse stroke of the handle from about −80 in/s to about −175 in/s when loosening the bead of the tire.

16. The method of claim of 13, further comprising:
j) reducing a forward stroke of the handle by at least about 20% when loosening the bead of the tire.

17. The method of claim of claim 13, further comprising:
j) reducing a reverse stroke of the handle by at least about 20% when loosening the bead of the tire.

18. The method of claim 10, wherein:
step b) further comprises operating the lever to a second position, wherein the operation valve channels the supply flow of the fluid through the second line into the second port and the operation valve channels the exhaust flow of the fluid through the first line out of the first port, such that the exhaust flow pressure of the first port approaches a value of 0 pounds per square inch (psi).

19. The method of claim 10, wherein:
the tire-bead loosener is a vertical tire-bead loosener or a horizontal tire-bead loosener.

20. The method of claim 10, wherein:
the damping pressure ranges from about 10 pounds per square inch (psi) to about 50 pounds per square inch (psi).

21. The method of claim 10, wherein:
step h) yields a pressure cushion between the damping pressure and the exhaust flow pressure of the second port against the supply flow pressure of the first port, the pressure cushion ranging from about 55 pounds per square inch (psi) to about 125 pounds per square inch (psi).

* * * * *